(12) United States Patent  
Gomi

(10) Patent No.: US 8,416,303 B2  
(45) Date of Patent: Apr. 9, 2013

(54) IMAGING APPARATUS AND IMAGING METHOD

(75) Inventor: Keizo Gomi, Kanagawa (JP)

(73) Assignee: Sony Corporation, Tokyo (JP)

( * ) Notice: Subject to any disclaimer, the term of this patent is extended or adjusted under 35 U.S.C. 154(b) by 719 days.

(21) Appl. No.: 12/609,577

(22) Filed: Oct. 30, 2009

(65) Prior Publication Data

US 2010/0141770 A1  Jun. 10, 2010

(30) Foreign Application Priority Data

Dec. 5, 2008  (JP) .................. 2008-311626

(51) Int. Cl.
*H04N 5/33* (2006.01)
*G01J 5/02* (2006.01)

(52) U.S. Cl.
USPC ..................... 348/164; 250/339.05

(58) Field of Classification Search .............. 348/164, 348/272, 273, 279, 278, 280, 170, 152, 78; 250/208.1, 226, 339.05, 338.1, 339.01; 382/167, 382/134, 275, 192
See application file for complete search history.

(56) References Cited

U.S. PATENT DOCUMENTS

| | | | | |
|---|---|---|---|---|
| 7,490,779 | B2* | 2/2009 | Shinozaki | 235/472.03 |
| 2008/0211916 | A1* | 9/2008 | Ono | 348/164 |
| 2008/0246950 | A1* | 10/2008 | Ono | 356/51 |
| 2010/0038543 | A1* | 2/2010 | Toda et al. | 250/339.05 |
| 2010/0128938 | A1* | 5/2010 | Chung et al. | 382/117 |

FOREIGN PATENT DOCUMENTS

| | | |
|---|---|---|
| JP | 5-297152 | 11/1993 |
| JP | 8-287216 | 11/1996 |
| JP | 10-210486 | 8/1998 |
| JP | 2000-221574 | 8/2000 |
| JP | 2003-6642 | 1/2003 |
| JP | 2005-197914 | 7/2005 |
| JP | 2006-217413 | 8/2006 |
| JP | 2008-181468 | 8/2008 |

OTHER PUBLICATIONS

Japanese Office Action issued Nov. 30, 2010, in Patent Application No. 2008-311626.

* cited by examiner

*Primary Examiner* — Behrooz Senfi
(74) *Attorney, Agent, or Firm* — Oblon, Spivak, McClelland, Maier & Neustadt, L.L.P.

(57) ABSTRACT

An imaging apparatus is provided which includes an imaging unit including a first photoelectrical conversion device and a second photoelectrical conversion device, wherein the first photoelectrical conversion device generates first image data by photoelectrically converting a visible light component transmitted from a subject, and wherein the second photoelectrical conversion device generates second image data by photoelectrically converting an infrared light component transmitted from the subject, a filter removing the visible light component but allowing the infrared light component to pass through, a subject image position identification unit for identifying, in the first image data, a predetermined subject image and a position of the predetermined subject image, an infrared light intensity detection unit for detecting an infrared light intensity transmitted in the second image data, and a living body detection unit for detecting a living body based on the position of the predetermined subject image and the infrared light intensity.

10 Claims, 14 Drawing Sheets

VISIBLE LIGHT IMAGE 4000×3000=12M 180

INFRARED LIGHT IMAGE 2000×1500=3M 190

INFRARED LIGHT IMAGE 2000×1500=3M 290

REFERENCE FACIAL AREA (VISIBLE LIGHT REFERENCE SIZE)

IMAGING APPARATUS AND IMAGING METHOD

BACKGROUND OF THE INVENTION

1. Field of the Invention

The present invention relates to an imaging apparatus and an imaging method.

2. Description of the Related Art

Recently, an imaging apparatus such as a digital camera and a video camera uses a facial recognition technique for recognizing whether the face of a person is included in a subject by extracting features of the face of the person from image data obtained by imaging the subject. In the facial recognition technique, a method using a visible light image is highly reliable, but the visible light image does not produce any difference between a figure of an actual person and a figure of a person printed on a printed material such as a poster and a picture. Therefore, since the printed figure may not be distinguished from the figure of the actual person based on the visible light image, the face may be recognized erroneously.

FIG. 14 is a block diagram showing a portion of a configuration of an ordinary imaging apparatus. In FIG. 14, a facial position identifying unit 12 and an imaging unit 20 mainly including a lens 18, a solid-state imaging device 2, and an infrared light cut filter 22 are extracted from the ordinary imaging apparatus for convenience of explanation. As shown in FIG. 14, the facial position identifying unit 12 directly receives a visible light image from the imaging unit 20, receives the visible light image which has been processed by an image processing unit (not shown), or receives the visible light image which is stored in a memory (not shown) upon being subjected to various processings.

It is generally known that a living body such as a human emits infrared light. In relation to detection of living body, there is a technique using an infrared camera capable of detecting infrared light. Japanese Patent Application Laid-Open (JP-A) No. H5-297152 and No. 2005-197914 disclose techniques for distinguishing a figure of an actual person from a figure drawn on a poster and the like by recognizing the face of the person in a subject, thus recognizing the figure of the actual person (living body).

SUMMARY OF THE INVENTION

However, the technique of JP-A No. H5-297152 requires a radiation thermometer and a control apparatus for orienting the radiation thermometer in a direction of temperature detection. Therefore, it was difficult to make a smaller living body recognition apparatus and a smaller imaging apparatus having the living body recognition apparatus, and it was difficult to reduce the cost.

In the technique using an infrared camera, obtained image data are expressed as brightness data according to the temperature. Therefore, there is an issue in that the reliability is low since the obtained image data do not provide sufficient amount of information to allow detection of facial pattern of an individual (facial image recognition). In other words, with the technique for detecting facial pattern based on an infrared light image, it is often unable to detect a face due to frequently-occurring erroneous determination, and failure often occurs in detecting the face even when the face is included in the subject. When determination criteria are eased to prevent failure in detection, it is necessary to perform facial image recognition on many pixel areas, thus offering no advantage in terms of time saving.

When an imaging device includes infrared light receiving pixels just like an imaging device used in JP-A No. 2005-197914, the imaging device has a fewer number of visible light receiving pixels. Therefore, there is an issue in that the quality of image deteriorates compared with an ordinary imaging device, all of whose pixels are visible light receiving pixels.

Further, JP-A No. 2005-197914 discloses a technique that uses a spectrograph (prism) to separate a light emitted from a subject into a visible light and an infrared light, which are received by a visible light imaging device and an infrared light imaging device, respectively. However, when an optical prism, a dichroic prism, or the like is used, there is an issue in that the size of the apparatus becomes large since it is difficult to make the apparatus smaller due to the necessity to secure an optical path. Further, when a prism is used, an imaging lens used in an imaging apparatus needs to be compatible with the prism. Further, the manufacturing of a dichroic prism requires a high level of technology since a high precision is required in bonding and the like. Therefore, there is an issue in that the manufacturing cost is extremely expensive. On the other hand, when the optical system is tried to be manufactured at low cost, the quality of each optical component decreases, and there arises an issue in that the quality of image deteriorates due to low precision.

The present invention is made in view of the above and other issues. The present invention provides a novel and improved imaging apparatus and a novel and improved imaging method capable of realizing a highly reliable living body facial recognition system that can be easily made smaller without deteriorating the quality of an image.

According to an embodiment of the present invention, there is provided an imaging apparatus including an imaging unit including a first photoelectrical conversion device and a second photoelectrical conversion device, wherein the first photoelectrical conversion device generates first image data by photoelectrically converting a visible light component transmitted from a subject, and wherein the second photoelectrical conversion device generates second image data by photoelectrically converting an infrared light component transmitted from the subject, a filter arranged on an optical axis extending from the subject and arranged on the subject side of the second photoelectrical conversion device, wherein the filter removes the visible light component but allows the infrared light component to pass through, a subject image position identification unit for identifying, in the first image data, a predetermined subject image and a position of the predetermined subject image within a screen, an infrared light intensity detection unit for detecting an infrared light intensity transmitted from the subject in the second image data, and a living body detection unit for detecting a living body based on the position of the predetermined subject image within the screen and the infrared light intensity at the position.

The living body detection unit may specify a living body detection area in the second image data in accordance with the position of the predetermined subject image within the screen, and may detect the living body based on the detected infrared light intensity within the living body detection area.

The living body detection unit may detect the living body based on the first image data and the second image data, which are obtained at a time.

The filter may be a movable member that can be arranged on the optical axis extending from the subject and that can be displaced from the optical axis.

According to another embodiment of the present invention, there is provided an imaging apparatus including an imaging unit including one imaging device, wherein the imaging device generates first image data by photoelectrically converting, in a first mode, a visible light component transmitted from a subject, and generates second image data by photoelectrically converting, in a second mode, an infrared light component transmitted from the subject, a filter for removing the visible light component but allowing the infrared light component to pass through, wherein the filter is switched by moving so that in the first mode, the filter is displaced from the optical axis extending from the subject to the imaging device and that in the second mode, the filter is arranged on the optical axis and arranged on the subject side of the imaging device, a subject image position identification unit for identifying, in the first image data, a predetermined subject image and a position of the predetermined subject image within a screen, an infrared light intensity detection unit for detecting an infrared light intensity transmitted from the subject in the second image data, and a living body detection unit for detecting a living body based on the position of the predetermined subject image within the screen and the infrared light intensity at the position.

The imaging unit time-divisionally may generate the first image data and the second image data, and the living body detection unit may detect the living body based on the first image data and the second image data, which are obtained at different times.

The predetermined subject image may be a face of a person or a portion or an entirety of a person.

According to another embodiment of the present invention, there is provided an imaging apparatus including an imaging unit for generating first image data by photoelectrically converting a visible light component transmitted from a subject and generating second image data by photoelectrically converting an infrared light component transmitted from the subject, a subject image position identification unit for identifying, in the first image data, a predetermined subject image and a position of the predetermined subject image within a screen, an infrared light intensity detection unit for detecting an infrared light intensity transmitted from the subject in the second image data, and a living body detection unit for detecting a living body based on the position of the predetermined subject image within the screen and the infrared light intensity at the position.

According to another embodiment of the present invention, there is provided an imaging method comprising the steps of generating first image data by causing a first photoelectrical conversion device to photoelectrically convert a visible light component transmitted from a subject, causing a filter to remove the visible light component and allowing an infrared light component to pass through, generating second image data by causing a second photoelectrical conversion device to photoelectrically convert an infrared light component transmitted from the subject, identifying, in the first image data, a predetermined subject image and a position of the predetermined subject image within a screen, detecting an infrared light intensity transmitted from the subject in the second image data, and detecting a living body from the position of the predetermined subject image within the screen and the infrared light intensity at the position, based on the first image data and the second image data, which are obtained at a time.

According to another embodiment of the present invention, there is provided an imaging method comprising the steps of generating first image data by causing one photoelectrical conversion device to photoelectrically convert a visible light component transmitted from a subject, arranging a filter on an optical axis extending from the subject to the one photoelectrical conversion device and arranged on the subject side of the one photoelectrical conversion device so that the filter removes the visible light component but allows an infrared light component to pass through, generating second image data by causing the one photoelectrical conversion device to photoelectrically convert the infrared light component transmitted from the subject, identifying a predetermined subject image in the first image data and a position of the predetermined subject image within a screen, detecting an infrared light intensity transmitted from the subject in the second image data, and detecting a living body from the position of the predetermined subject image within the screen and the infrared light intensity at the position, based on the first image data and the second image data, which are obtained at different times.

An embodiment of the present invention realizes a highly reliable living body facial recognition system that can be easily made smaller without deteriorating the quality of an image.

DETAILED DESCRIPTION OF THE EMBODIMENT(S)

Figure 1:
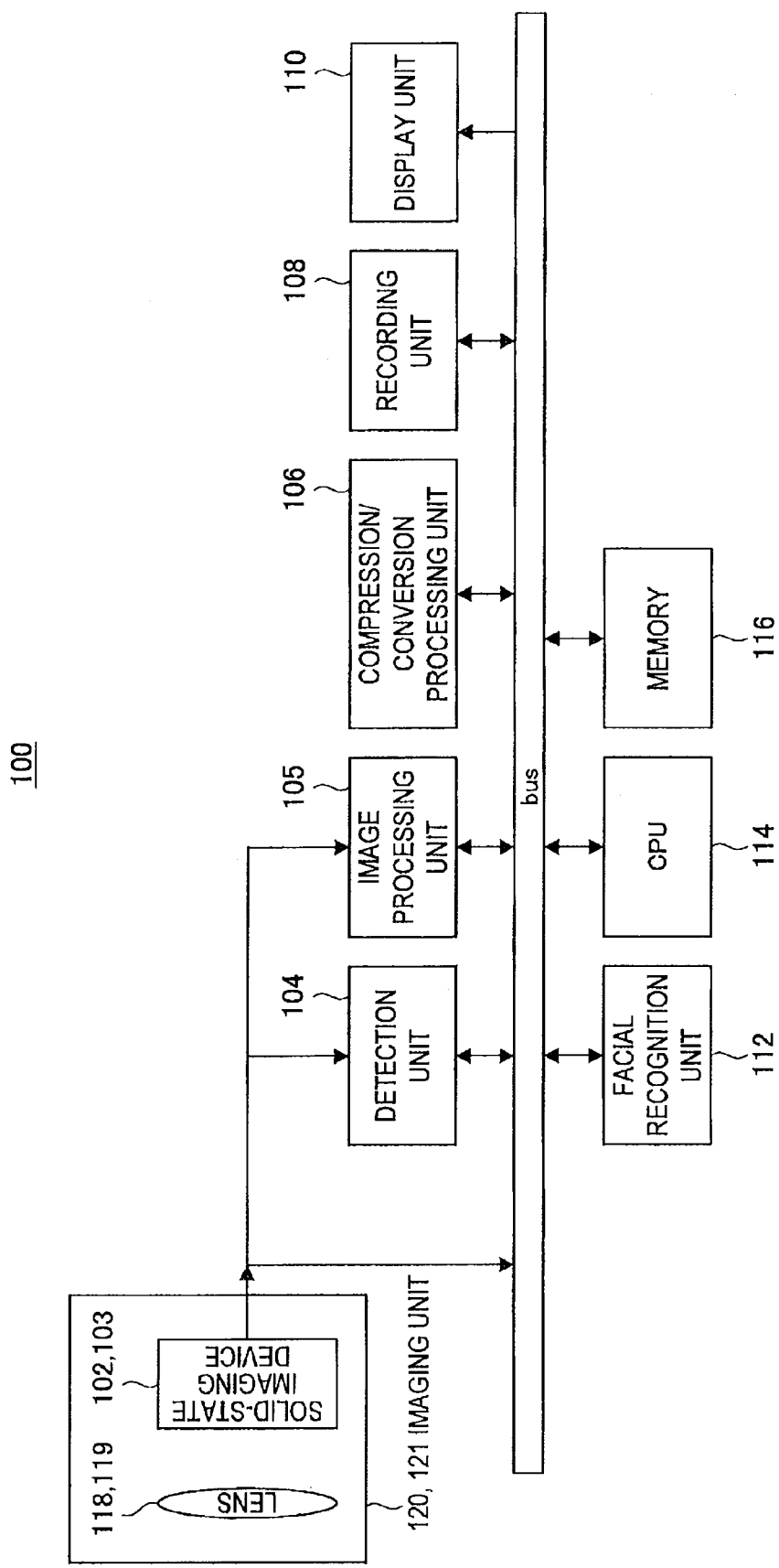
FIG. 1 is a block diagram showing an imaging apparatus according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted. The embodiments will be described in the order listed below.
1. First Embodiment
2. Second Embodiment
3. Third Embodiment
4. Fourth Embodiment
5. Fifth Embodiment 1. First Embodiment Configuration of First Embodiment First, an imaging apparatus 100 according to the first embodiment of the present invention will be described.

The imaging apparatus 100 according to the present embodiment is, for example, a digital still camera including imaging lenses 118 and 119, which are either exchangeable or non-exchangeable. Further, the imaging apparatus 100 can be applied to an apparatus having an imaging function such as a video camera, a camcorder, a portable telephone, and a PDA (Personal Digital Assistant). Further, the imaging apparatus 100 according to the present embodiment can also be applied to a processing apparatus and a recording apparatus for processing an image signal obtained by a small camera for videophone or game software connected to a personal computer and the like.

Each processing function of the imaging apparatus 100, explained later, can be implemented by either hardware or software. The image processing described in this specification is performed on R, G and B of input data (RAW data) processed by the signal processing of the imaging apparatus 100. In the below explanation of the present embodiment, RAW data in Bayer format are employed.

First, the configuration of the imaging apparatus 100 according to the present embodiment will be explained. FIG. 1 is a block diagram showing the imaging apparatus 100 according to the present embodiment.

The imaging apparatus 100 includes imaging units 120 and 121, a detector unit 104, an image processing unit 105, a compression/conversion processing unit 106, a recording unit 108, a display unit 110, a facial recognition unit 112, a CPU 114, a memory 116, and the like.

The imaging units 120 and 121 respectively include imaging lenses 118 and 119, a solid-state imaging device 102 (first photoelectric converter device), a solid-state imaging device 103 (second photoelectric converter device), and the like. The imaging lenses 118 and 119 are a group of lenses that gather a light incident from a subject so as to form a subject image on the solid-state imaging devices 102 and 103. The imaging lenses 118 and 119 usually include a plurality of lenses.

The solid-state imaging devices 102 and 103 convert the incident light transmitted from the subject via the optical system (including, for example, the imaging lenses 118 and 119, an infrared light cut filter 122, and an optical low pass filter) into an electric signal through photoelectric conversion. The solid-state imaging devices 102 and 103 use, for example, a CMOS (Complementary Metal Oxide Semiconductor) imaging device. The CMOS imaging device includes photodiodes, row/column selection MOS transistors, signal lines, and the like, which are arranged in a two dimensional form, and includes a vertical scanning circuit, a horizontal scanning circuit, a noise reduction circuit, a timing generation circuit, and the like. It should be noted that a CCD (Charge Coupled Device) may be used as the solid-state imaging devices 102 and 103.

The solid-state imaging devices 102 and 103 read signals at a frame rate of, for example, 60 fps (fields/second). The solid-state imaging devices 102 and 103 are embedded with CDSs (Correlated Double Sampling) and A/D converters, and image data are output from the solid-state imaging devices 102 and 103.

The solid-state imaging devices 102 and 103 generally use, for example, a CCD (Charge Coupled Device) device and a CMOS (Complementary Metal Oxide Semiconductor) device.

The solid-state imaging devices 102 and 103 include a plurality of light receiving units (pixels). Each of the light receiving units (pixels) of the solid-state imaging devices 102 and 103 is usually covered with a pixel filter selectively passing a wavelength corresponding to either of R, G and B. Bayer format is generally used as the format of the RGB filter. In some cases, the filter is not RGB filter but may be a YCyMgG complimentary filter. The visible light obtained by the pixel through the filter is photoelectrically converted into an RGB signal, and the RGB signal is output as an image signal.

Although the pixel filter is selective, the characteristic of the pixel filter is so broad that the pixel filter passes much light having wavelengths, other than the selected wavelength, around the selected wavelength. Therefore, especially, the R pixel near the infrared region photoelectrically converts an infrared light that may not be perceived by human eyes, thus greatly affecting the visible light image. In order to reduce this affect, an infrared light cut filter is usually arranged, in addition to the pixel filter of the solid-state imaging device, between the imaging lens 118 and the solid-state imaging device 102 or between the imaging lens 119 and the solid-state imaging device 103

The detector unit 104 calculates information needed for various controls (for example, AF, AE and AWB) from the images obtained by the solid-state imaging devices 102 and 103. The detector unit 104 not only detects the image data obtained by the solid-state imaging devices 102 and 103, but also may detect image data output by other means in some cases.

The image processing unit 105 performs camera signal processings, such as synchronization processing, white balance correction, aperture correction, gamma correction, and YC generation, on the image data obtained by the imaging units 120 and 121.

The compression/conversion processing unit 106 performs display skipping and size adjustment so as to convert an image signal received from the image processing unit 105 into an image signal of a display size and a frame rate in conformity with the display of the display unit 110. The display skipping is performed when the image signal is output to the display unit 110. The display skipping means to skip fields according to the number of fields per unit time (for example, 30 fps) defined by a display standard of a display apparatus showing an image when the imaging apparatus 100 is in a fast imaging mode.

Further, the compression/conversion processing unit 106 performs a compression and encoding processing on image data received from the image processing unit 105 in accordance with a still image encoding method such as JPEG (Joint Photographic Experts Group) standard. In addition, the compression/conversion processing unit 106 performs an extraction and decoding processing on encoded data of a still image received from the recording unit 108. Further, the compression/conversion processing unit 106 performs a compression and encoding processing on image data received from the image processing unit 105 in accordance with a motion picture encoding method such as MPEG (Moving Picture Experts Group) standard. In addition, the compression/conversion processing unit 106 performs an extraction and decoding processing on encoded data of a motion picture received from the recording unit 108 and outputs the data to the display unit 110.

The recording unit 108 is, for example, a recording medium such as flash memory and hard disk drive. The display unit 110 is controlled by a display control unit (not shown). The display control unit generates an image signal to be displayed on the display unit 110 from the image signal received from the compression/conversion processing unit 106, and sends the image signal to the display unit 110 so as to display the image. The display unit 110 is made with, for example, an LCD (Liquid Crystal Display) to display a camera-through image during imaging and an image of data recorded on the recording unit 108.

The CPU (Central Processing Unit) 114 performs a centralized control on each of the constituent elements of the imaging apparatus 100 by executing programs stored in the memory 116.

The memory 116 is controlled by a memory control unit (not shown). The memory control unit controls writing and reading of image data to and from the memory 116. The memory 116 is, for example, SDRAM (Synchronous Dynamic Random Access Memory).

The facial recognition unit 112 includes a facial position identification unit 132 and a living body recognition unit 134, which will be explained later. The facial position identification unit 132 is an example of a subject position identification unit. The living body recognition unit 134 is an example of an infrared intensity detection unit using infrared intensity detection and a living body detection unit.

It should be noted that the arrangement of each of the above functional blocks is arranged for the sake of convenience, and it is to be understood that the position thereof is not limited thereto.

After imaging, the imaging unit 120 sends visible light image data to the facial position identification unit 132. The visible light image data may be an image in three primary colors, RGB, but may be a YC image which is converted therefrom.

The detection of face is performed based on generally-available pattern recognition technique. In other words, the processing for detecting a face includes the steps of cropping a portion of image data and comparing the portion with a reference pattern previously prepared in a database and the like to perform matching, thus detecting whether a facial pattern is present. It should be noted that the reference pattern is made by extracting features of images by filtering images with various filters and making the features into the database. For example, the reference pattern is made by patternizing profile of a face, eyes, a nose, a mouth, ears, and the like based on brightness edges, and includes flesh color of a person and the like.

When a presence of a facial pattern is recognized as a result of the above detection, and a position of the facial pattern in the image is identified, the facial position identification unit 132 of the imaging apparatus 100 determines a corresponding facial image area. Generally, the facial image area is in a rectangular shape, but may be in other shapes such as an elliptic shape.

Operation of First Embodiment

Next, operation of the imaging apparatus 100 according to the present embodiment will be described.

In the imaging apparatus 100 according to the present embodiment, a light emitted from a subject passes through the imaging lenses 118 and 119 and forms subject images on imaging planes of the solid-state imaging devices 102 and 103, and the solid-state imaging devices 102 and 103 photoelectrically convert the subject images into image data of each pixel.

The image processing unit 105 performs, based on an instruction from the CPU 114, various image processings, such as various corrections of AE and AWB, noise reduction, developing the image into YC data, converting resolution, and the like, on the image data obtained by the solid-state imaging devices 102 and 103. Once the facial recognition unit 112 finds the area of the face through the facial recognition, the facial recognition unit 112 may use the area of the face for the correction processing of AE, AWB, and the like. AF control may be performed to focus on the facial area.

The compression/conversion processing unit 106 converts a developed image into a compressed format such as MPEG and JPEG. The recording unit 108 records the converted data to a medium such as a non-volatile memory, an HDD, and a magneto optical disk. At the same time, the display unit 110 may display the image on a liquid crystal panel arranged on the imaging apparatus 100, or may convert the image into a video signal, which is output from an external terminal, so that the image is displayed on a home television.

Detailed Configuration of First Embodiment

Figure 2:
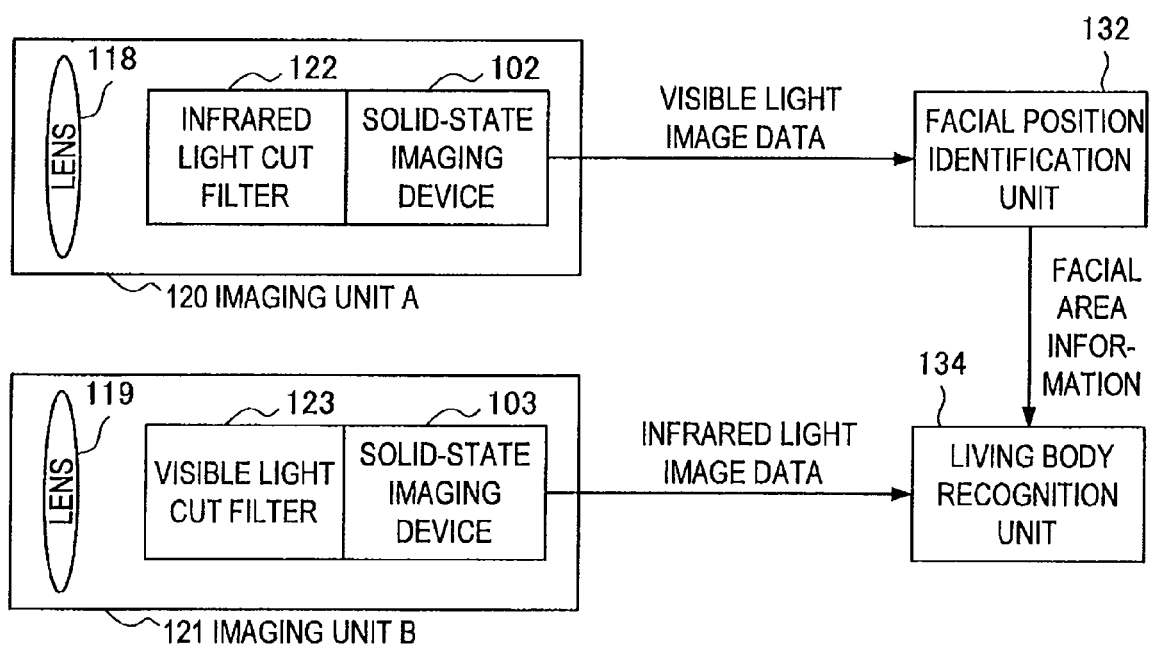
FIG. 2 is a block diagram showing a portion of a configuration of the imaging apparatus according to the embodiment.

Next, the detailed configuration of the imaging apparatus 100 according to the first embodiment of the present invention will be described. FIG. 2 is a block diagram showing a portion of the configuration of the imaging apparatus 100 according to the first embodiment of the present invention.

The imaging apparatus 100 according to the present embodiment includes the imaging unit A 120 having the solid-state imaging device 102 equipped with the infrared light cut filter 122 and the imaging unit B 121 having the solid-state imaging device 103 equipped with the visible light cut filter 123. The infrared light cut filter 122 is arranged between the imaging lens 118 and the solid-state imaging device 102. The visible light cut filter 123 is arranged between the imaging lens 119 and the solid-state imaging device 103.

The imaging apparatus 100 simultaneously generates visible light image data (first image data) photographed by the imaging unit A 120 and infrared light image data (second image data) photographed by the imaging unit B 121. The facial position identification unit 132 identifies data area corresponding to a facial image of a person within the screen based on the visible light image data. The living body recognition unit 134 detects a ratio of infrared light-output pixels in the facial image area, which are specified in the infrared light image data to correspond to the identified data area. The living body recognition unit 134 can detect a living body based on the visible light image data and the infrared light image data, which are obtained at a time.

In the present embodiment, the solid-state imaging devices 102 and 103 of the visible light input side and the infrared light input side may have the same number of or different numbers of pixels. When the solid-state imaging devices 102 and 103 have different numbers of pixels, one of the solid-state imaging devices 102 and 103 having more pixels is generally configured to be used for visible light image, and one of the solid-state imaging devices 102 and 103 having less pixels is generally configured to be used for infrared light image.

Figure 14:
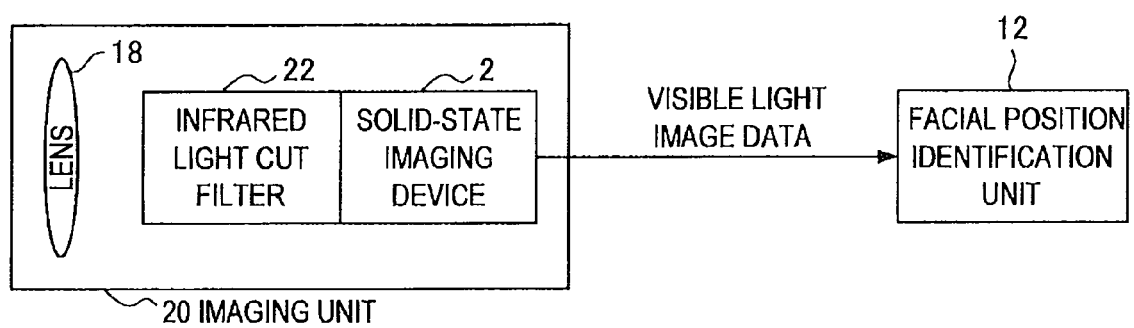
FIG. 14 is a block diagram showing a portion of a configuration of an ordinary imaging apparatus.

The imaging apparatus 100 according to the present embodiment has not only the configuration of the ordinary example shown in FIG. 14 but also another imaging unit, i.e., the imaging unit B 121. The imaging unit B 121 has the visible light cut filter 123 in place of the infrared light cut filter 122 of the imaging unit A 120 in order to photoelectrically convert the infrared light output.

The infrared light received by the solid-state imaging device 103 is photoelectrically converted into a signal having a signal level according to the amount of the infrared light, and the signal is output. The amount of the infrared light is associated with the magnitude of the signal level. Especially, the photoelectric conversion of the R pixel, which has a wavelength near infrared light, produces a significant result. In the imaging unit A 120 on the visible light image side, the facial position identification unit 132 performs facial position identification to identify the position of the face (facial area) within the image. The number of identified facial image areas may not be one. The imaging unit B 121 sends the infrared light image data to the living body recognition unit 134, and the facial position identification unit 132 sends the facial area information to the living body recognition unit 134. Since the R pixel is most responsive to infrared light, the imaging unit B 121 may send data of only the R pixel as an infrared light image, so that the amount of data (electric power) can be saved.

The imaging unit A 120 and the imaging unit B 121 may be using different coordinate systems, because, e.g., they are of different resolutions. Therefore, it may be necessary to convert coordinates of the facial area information. The coordinates are converted by, for example, a circuit in the imaging unit A 120 or the imaging unit B 121 or by the CPU 114 (control unit). The converted coordinates are sent to the living body recognition unit 134.

Whether an image is a figure of a living person or not is determined by calculating a ratio of the number of pixels in which infrared light output is found with respect to the number of pixels in the facial area of the infrared light image. The image is ultimately determined to be a face of a person when the ratio is more than a predetermined threshold value (for example, 50%). There are several methods for determining the threshold value of infrared light output. For example, since the signal level increases according to the exposure time, the threshold value may be calculated by preparing statistical data for each exposure time. Then, the threshold value for each exposure time is stored in a database, and infrared light output is determined to be present when the ratio is more than the threshold value. In the above explanation, whether infrared light output is present or not is determined with two values, but a plurality of threshold values may be prepared so that the determination may be made with multiple values such as three values (infrared light is present, unknown (border area between presence and absence of infrared light), and infrared light is absent).

In the present embodiment, highly accurate facial recognition with a visible light image is initially performed, so that erroneous determination and failure in recognition can be reduced. Then, whether the image represents a living body or not is determined at the last by emitting infrared light, so that whether the image in the facial area represents not only a living body but also a person can be reliably recognized.

Figure 3:
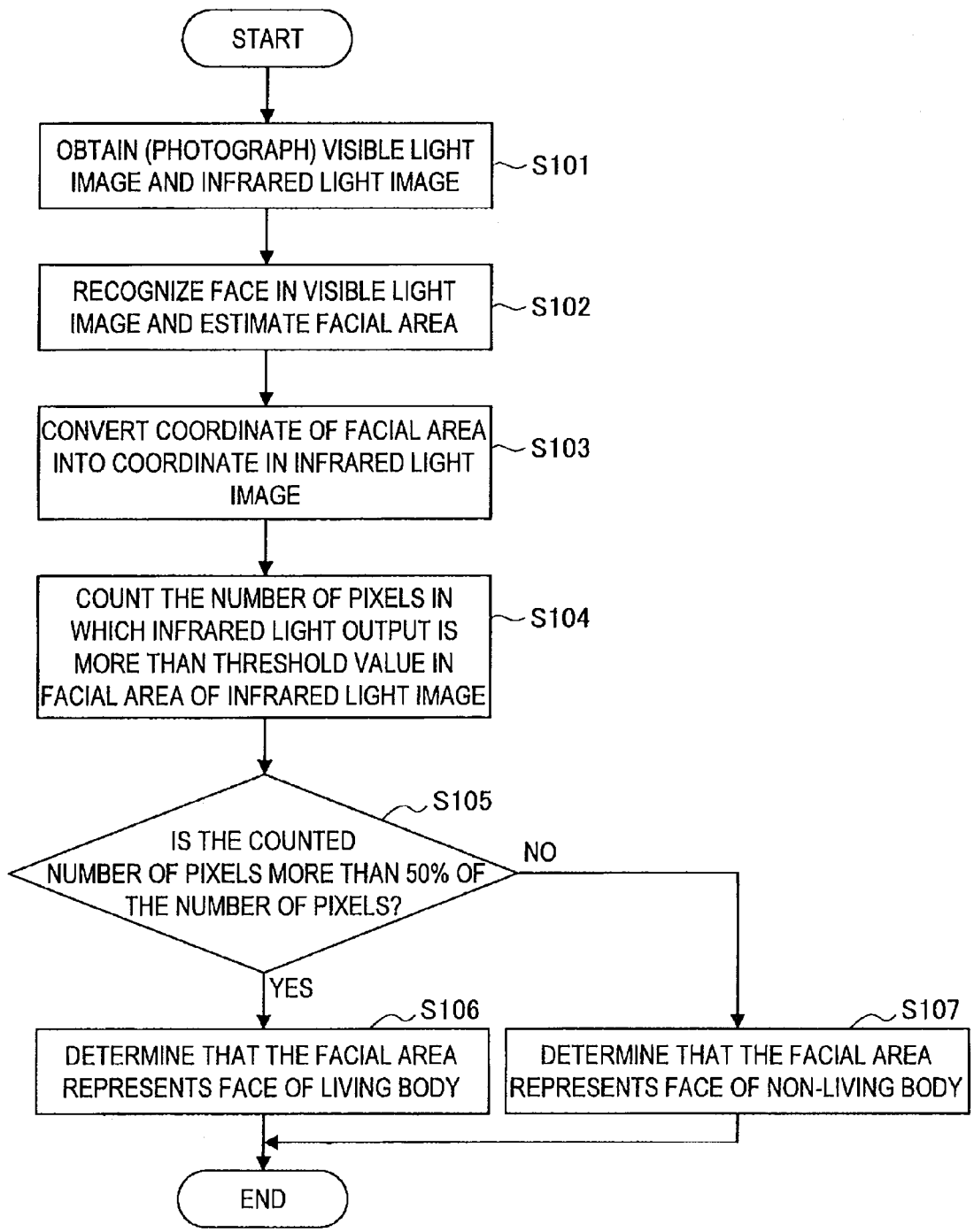
FIG. 3 is a flowchart showing operation of the imaging apparatus according to the embodiment.

Operation performed by the imaging apparatus 100 according to the present embodiment configured as described above will be hereinafter described with reference to FIG. 3 and FIG. 4. FIG. 3 is a flowchart showing operation of the imaging apparatus 100 according to the present embodiment.

FIG. 4 is an explanatory diagram schematically showing an image obtained by the imaging apparatus 100 according to the present embodiment.

Figure 4A:
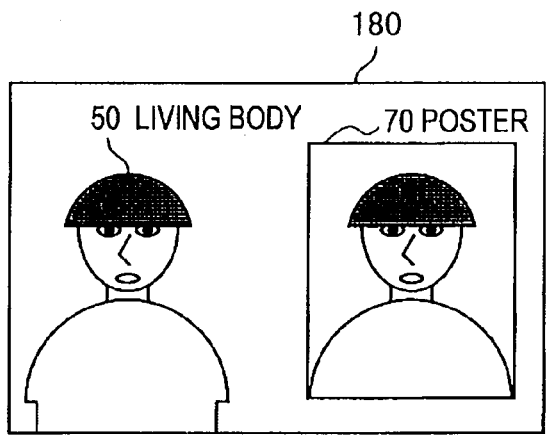
FIG. 4 is an explanatory diagram schematically showing an image obtained by the imaging apparatus according to the embodiment.

First, the imaging unit A 120 and the imaging unit B 121 photograph a subject to obtain both of visible light image data and infrared light image data in one shot (step S101). FIG. 4A briefly shows an example of visible light image data 180. For the sake of explanation, a living person 50 and a figure of a person printed on a poster 70 are assumed to be photographed in a single shot. At this moment, the facial area is estimated by facial recognition with a visible light image (step S102).

Figure 4B:
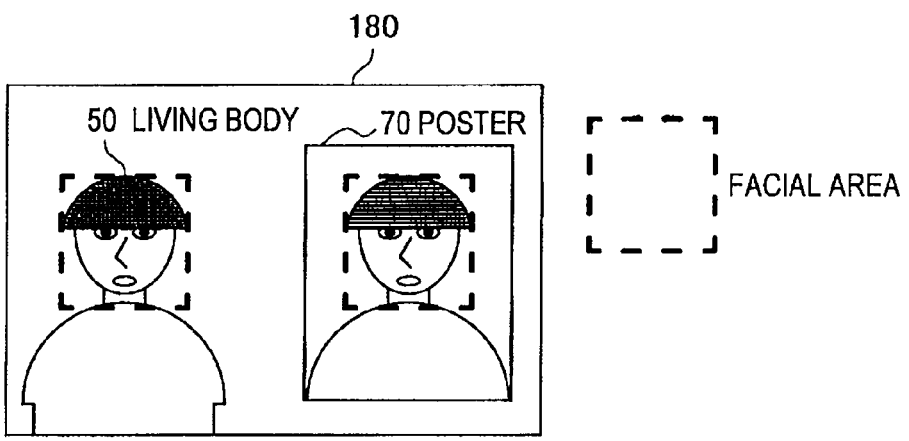
Figure 4C:
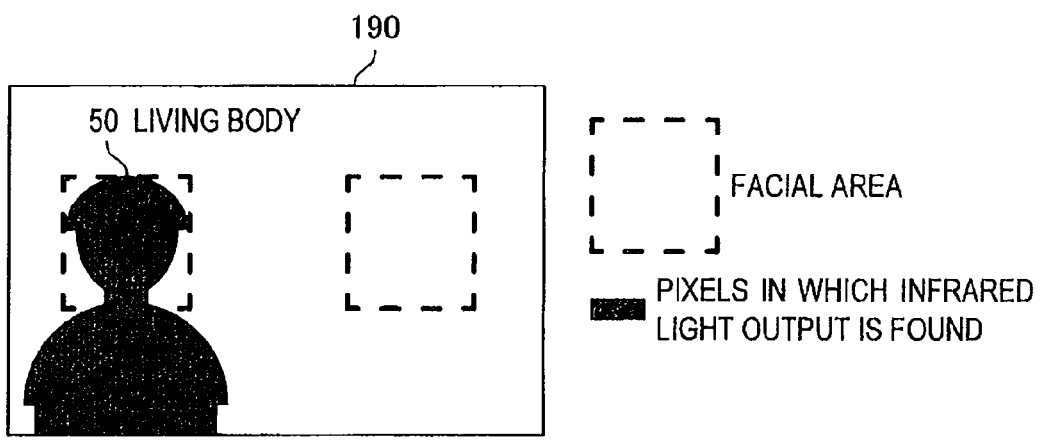

FIG. 4B shows a case where the facial area is estimated as a rectangular area. In the visible light region, the visible light image data 180 does not produce any difference between the living body 50 and the face printed on the poster 70. Therefore, the image is determined to include two faces. FIG. 4C shows an infrared light image 190. In FIG. 4C, a pixel in which infrared light output is equal to or more than a threshold value is represented in black, whereas a pixel in which infrared light output is less than the threshold value is represented in white. The threshold value can be changed in response to an instruction given by the CPU in accordance with a photographing environment. Next, the facial area estimated based on the visible light image may be converted into the coordinate system of the infrared light image 190 (step S103), when necessary, for example, when the solid-state imaging device 102 and the solid-state imaging device 103 are different in the resolution. FIG. 4 (C) shows the estimated facial area in the coordinate system of the infrared light image 190.

Next, in the facial area of the infrared light image 190, the number of pixels in which infrared light output is found and is more than the threshold value is counted (step S104). Then, the number of pixels in which infrared light output is found is compared with the total number of pixels of the facial area, and the ratio therebetween is calculated. A determination is made as to whether the number of pixels in which infrared light output is found is more than a predetermined ratio (for example, 50%) with respect to the total number of pixels of the facial area (step S105). When the number of pixels in which infrared light output is found is more than the predetermined ratio (for example, 50%), the facial area is determined to be a face of a living body (step S106). On the other hand, when the number of pixels in which infrared light output is found is not more than the predetermined ratio (50%), the facial area is determined to be a face of a non-living body (step S107). Any infrared light output is not found in the face printed on the poster 70, and the number of pixels in which infrared light output is found is not more than the predetermined ratio (50%). Therefore, the face printed on the poster 70 is determined to be a face of a non-living body. The predetermined ratio can be changed in response to an instruction given by the CPU 114 in accordance with a photographing environment.

Even when the visible light image 180 and the infrared light image 190 are different in the number of pixels or the field angle, a coordinate in the facial area of the infrared light image 190 can be easily known by calculating the coordinate based on a coordinate in the facial area of the visible light image 180. Further, since the determination is made based on the ratio of infrared light outputs in the facial area of the infrared light image 190, it does not matter whether the solid-state imaging device 102 and the solid-state imaging device 103 are different in the size of the sensor or in the field angle.

For example, a case where the solid-state imaging device 102 and the solid-state imaging device 103 are different in the size of the sensor or in the field angle will be explained with reference to FIG. 5. FIG. 5 is an explanatory diagram briefly showing the difference in the resolution or the difference in the size of the sensor between the visible light image and the infrared light image.

Figure 5A:
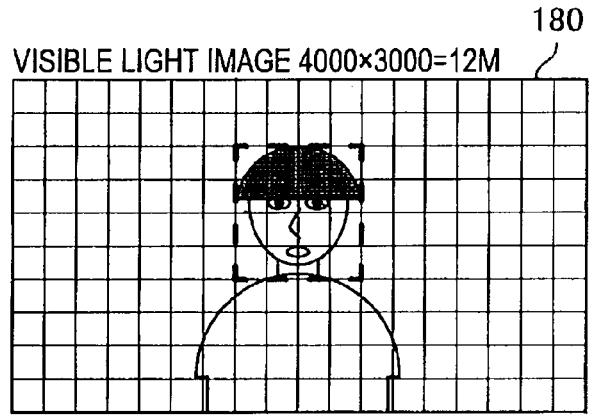
FIG. 5 is an explanatory diagram briefly showing a difference in resolution or a difference in size of a sensor between a visible light image and an infrared light image.
Figure 5B:
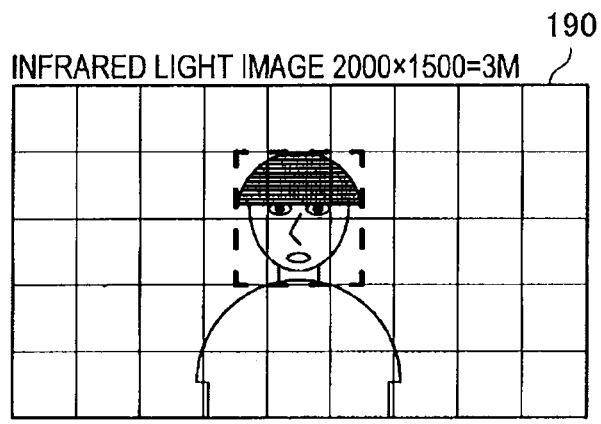

FIG. 5A shows an example of a visible light image of 12 M pixels arranged in a matrix of 4000 by 3000. FIG. 5B shows an example of an infrared light image of 3 M pixels arranged in a matrix of 2000 by 1500. Since the examples of FIG. 5A and FIG. 5B have the same field angle, a coordinate in the facial area of the infrared light image can be easily known by calculating the coordinate based on a coordinate in the facial area of the visible light image, although the examples of FIG. 5A and FIG. 5B are different in the resolution.

Figure 5C:
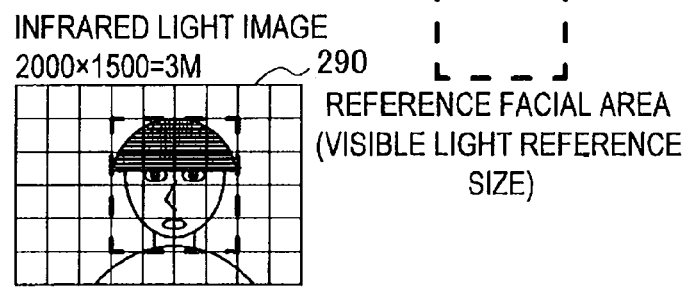

FIG. 5C shows an example of an infrared light image of 3 M pixels arranged in a matrix of 2000 by 1500. The infrared light image corresponds to a portion of the visible light image. Since the start position of cropping of the infrared light image is fixed and previously known, a coordinate in the facial area of the infrared light image can be easily known by calculating the coordinate based on a coordinate in the facial area of the visible light image, although the examples of FIG. 5A and FIG. 5B are different in the field angle.

2. Second Embodiment

Figure 6A:
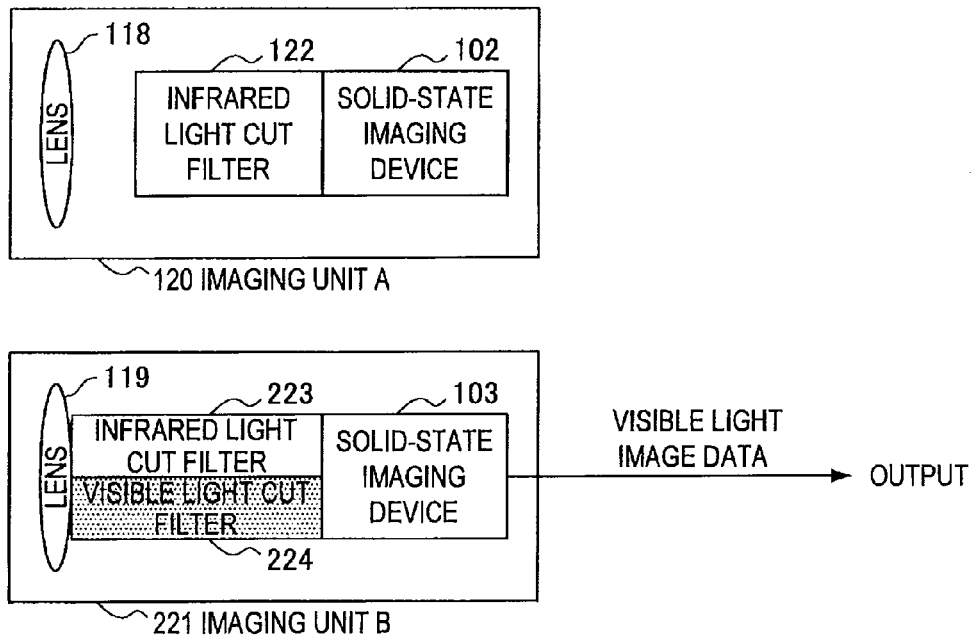
FIG. 6 is a block diagram showing a portion of a configuration of an imaging apparatus according to a second embodiment of the present invention.
Figure 6B:
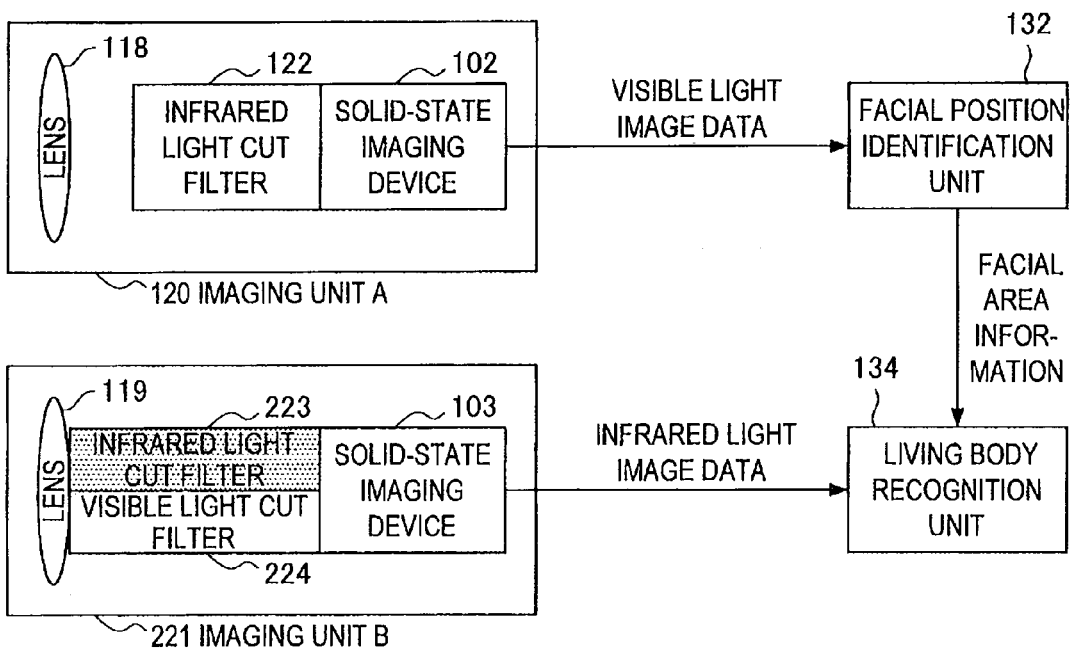

Next, an imaging apparatus 200 according to the second embodiment of the present invention will be described. FIG. 6 is a block diagram showing a portion of a configuration of the imaging apparatus 200 according to the present embodiment. FIG. 6A shows operational state before photographing. FIG. 6B shows operational state after photographing.

In the above-described first embodiment, the plurality of sensors (the solid-state imaging devices 102 and 103) are previously fixed to the unit for infrared light image and the unit for visible light image, respectively. In the photographing apparatus 200 according to the present embodiment, an imaging unit B 221 for infrared light image does not need to be exclusively for infrared light.

The imaging apparatus 200 according to the present embodiment such as a digital single-lens reflex camera has two imaging units 120 and 221, which respectively include the solid-state imaging device 103 (small size sensor) for seeing a subject and the solid-state imaging device 102 (large size sensor) for recording. The photographing conditions are decided while the image of the solid-state imaging device 103 (small size sensor) is displayed. Once the shutter is triggered, the solid-state imaging device 102 (large size sensor) is used to photograph an image to be saved. In this case, the two imaging units 120 and 221 respectively have infrared light cut filters 122 and 223, which are for visible light images and are used to obtain visible light images.

In the imaging apparatus 200 according to the present embodiment, a filter section of the imaging unit B 221 (arranged on the solid-state imaging device 103 (small size sensor), which is on a side different from the imaging unit A 120 used for recording) is configured to be switchable between an infrared light cut filter 223 and a visible light cut filter 224. The filter section is a movable member, which can be disposed on the optical axis extending from the subject and can be displaced from the optical axis. For example, each filter moves in parallel, moves rotationally, or the like.

Figure 7:
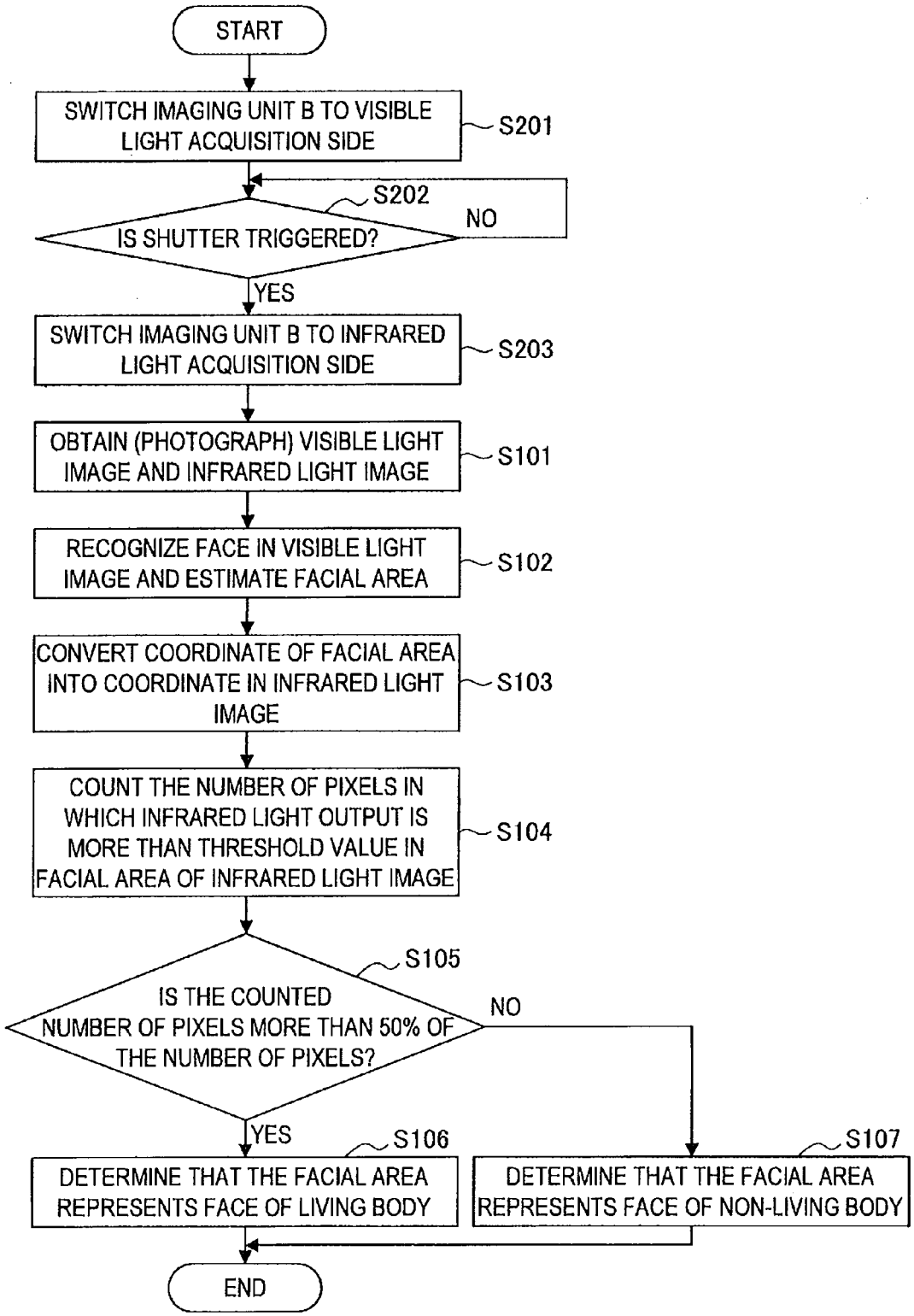
FIG. 7 is a flowchart showing operation of the imaging apparatus according to the embodiment.

Next, operation of the imaging apparatus 200 according to the present embodiment will be described with reference to FIG. 7. FIG. 7 is a flowchart showing operation of the imaging apparatus 200 according to the present embodiment.

Under normal operation, the imaging unit B 221 uses the infrared light cut filter 223 to output the visible light image as shown in FIG. 6A (step S201). When the photographing conditions are decided and the shutter button is pressed (step S202), the filter section of the imaging unit B 221 switches to the visible light cut filter 224 as shown in FIG. 6B (step S203). The imaging unit B 221 obtains the infrared light image at the same time as when the imaging unit A 120 obtains the visible light image.

The imaging apparatus 200 according to the present embodiment is the same as the imaging apparatus 100 according to the first embodiment except that the filter section of the imaging unit B 221 is configured to be switchable. Therefore, after the visible light cut filter 224 is selected so that the imaging apparatus 200 goes into the infrared light image acquisition mode, the imaging apparatus 200 according to the present embodiment is the same as the imaging apparatus 100 according to the first embodiment shown in FIG. 2 and performs the same steps as steps S101 to S107 in the flowchart of FIG. 3.

Modification of Second Embodiment

Figure 8:
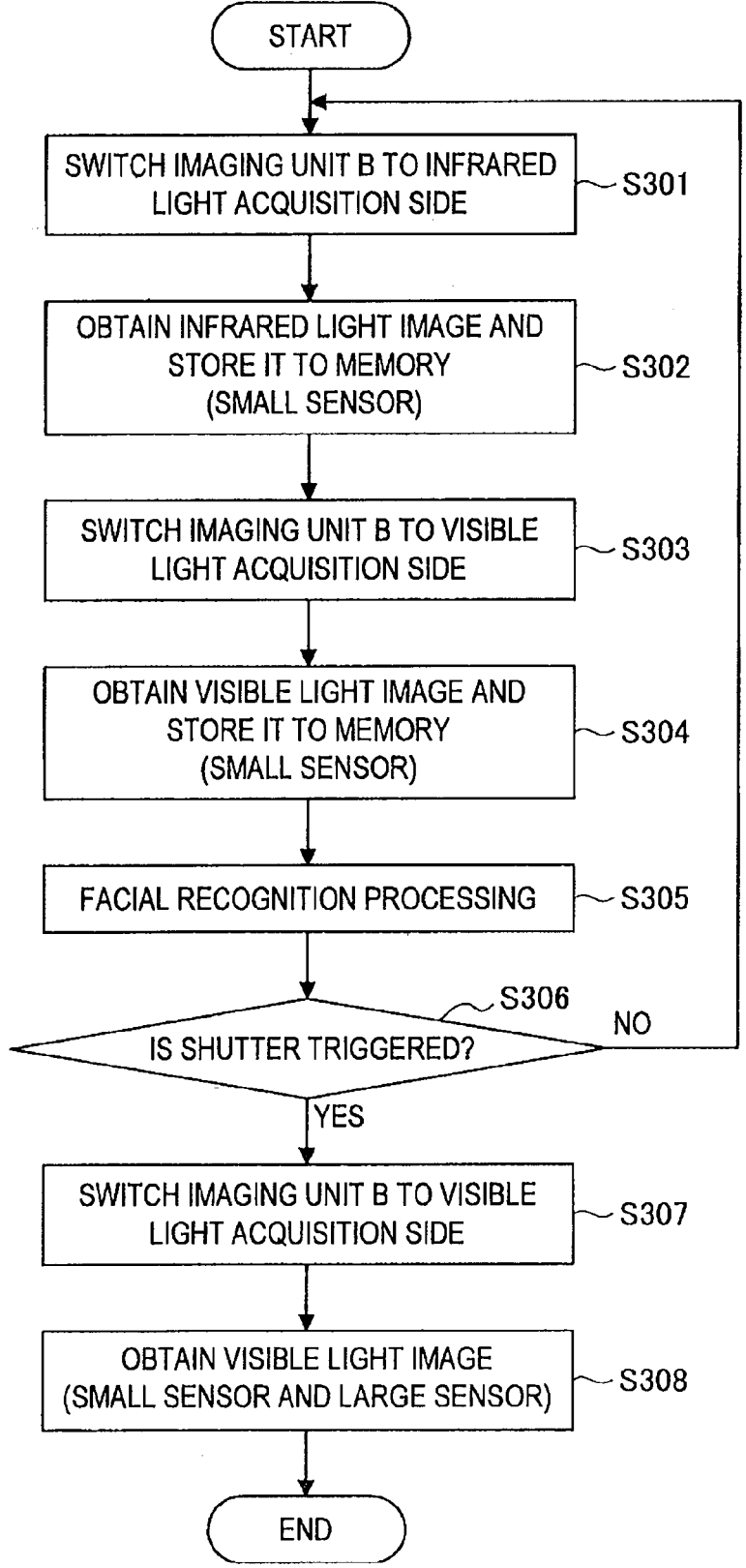
FIG. 8 is a flowchart showing operation of a modification of the imaging apparatus according to the embodiment.

Next, a modification of the present embodiment will be described with reference to FIG. 8. FIG. 8 is a flowchart showing operation of the modification of the imaging apparatus 200 according to the present embodiment.

In the above explanation of the operation of the imaging apparatus 200 according to the present embodiment, the imaging unit B 221 is switched to the infrared light image acquisition side after the shutter button is pressed. However, there may be a case where the imaging unit B 221 is desired to be used in the visible light image acquisition side due to some reason even after the shutter button is pressed. In order to use the imaging unit B 221 in the visible light image acquisition side, the infrared light image may be obtained while the photographing conditions are obtained before the shutter button is pressed.

In the below explanation, images are assumed to be obtained from the imaging unit B 221 at 60 fps before the shutter is triggered. At this moment, the filter section is switched every one image (every one frame) so that the visible light image and the infrared light image are obtained alternately. The obtained visible light images and the obtained infrared light images are temporarily stored in a memory (steps S301 to S304). The visible light images can be displayed on the display unit 110 such as a liquid crystal panel at 30 fps.

When the shutter is triggered (step S306), the imaging unit B 221 is also switched to be suitable for the visible light image (step S307). Then, both of the imaging unit A 120 and the imaging unit B 221 obtain the visible light images (step S308), and perform imaging processings. At this occasion, the infrared light image immediately before the shutter is triggered is stored in the memory. The infrared light image stored in the memory is used as a substitute for the infrared light image that is to be obtained at the same time as the photographing in step S 203 of FIG. 7 described above. After the infrared light image is obtained, the modification of the imaging apparatus 200 according to the present embodiment performs the same steps as steps S101 to S107 in the flowchart of FIG. 3.

In this modification, the rate of the visible light images used for display is 30 fps. If the rate is too low and causes issues, the imaging unit B 221 may reduce the ratio of the number of outputs of infrared images with respect to the number of outputs of images so as to increase the frame rate of the visible light images used for display.

The above-described first embodiment and the above-described second embodiment employ the method for detecting a face based on an image used for recording (visible light image) obtained after the shutter is triggered. But there may be a case where the face is desired to be detected before the photographing conditions are decided, namely, before the shutter is triggered. In such case, as shown in the flowchart of FIG. 8, the imaging unit B 221 may alternately obtain the visible light image and the infrared light image, which are stored in the memory (step S301 to S304), so that the living body facial recognition processing may be performed based on the two types of images (see steps S101 to S107 in the flowchart of FIG. 3).

As described above, in the imaging apparatus 200 according to the present embodiment, the filter section disposed between the imaging lens 119 and the solid-state imaging device 103 is configured to be able to switch between the infrared light cut filter 223 and the visible light cut filter 224. Therefore, the imaging apparatus 200 according to the present embodiment can achieve the living body facial recognition function in addition to the ordinary recording and display functions. It is easy to add the function of the present embodiment to an ordinary apparatus since it is not necessary to modify the configuration of the ordinary apparatus. In addition, the functions of the ordinary apparatus will not be lost. Therefore, the living body facial recognition function can be easily introduced and achieved at low cost.

3. Third Embodiment

Figure 9A:
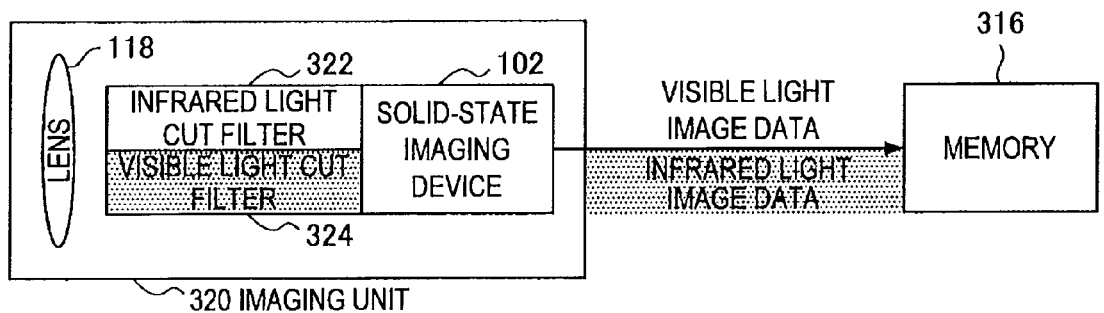
FIG. 9 is a block diagram showing a portion of a configuration of an imaging apparatus according to a third embodiment of the present invention.
Figure 9B:
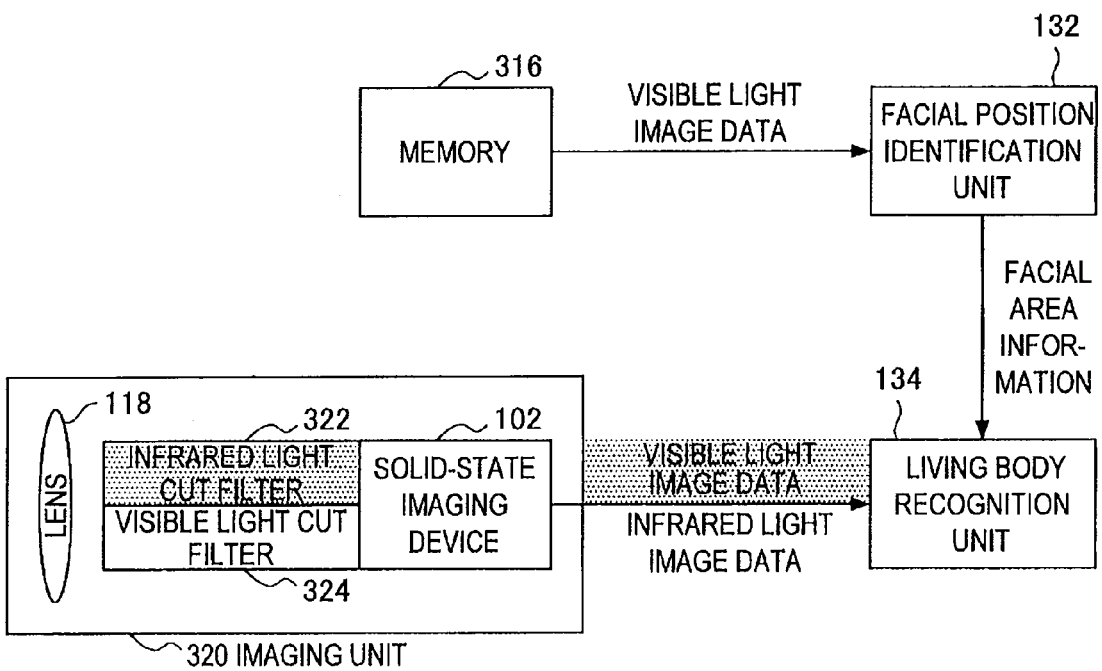

Next, an imaging apparatus 300 according to the third embodiment of the present invention will be described. FIG. 9 is a block diagram showing a portion of a configuration of the imaging apparatus 300 according to the present embodiment. FIG. 9A shows operational state before photographing. FIG. 9B shows operational state after photographing. The imaging apparatus 300 according to the present embodiment includes only one imaging unit 320 having the solid-state imaging device 102.

As shown in FIG. 9A and FIG. 9B, the imaging apparatus 300 has the infrared light cut filter 322 and the visible light cut filter 324, which are switchable. The single imaging unit 320 generates visible light image data (first image data) and infrared light image data (second image data) by photographing multiple times. Further, the imaging apparatus 300 has a memory 316 for storing photographed images. A facial position identification unit 132 according to the present embodiment identifies a data area corresponding to a facial image of a person within a screen based on the visible light image data stored in the memory 316. The living body recognition unit 134 detects the ratio of pixels in which infrared light is output in the facial image area specified in the infrared light image data so as to correspond to the identified data area.

Next, operation of the imaging apparatus 300 according to the present embodiment will be described.

As shown in FIG. 9A, the filter section of the imaging unit 320 is switched to the side of the infrared light cut filter 322 at first. When the shutter button is pressed, a normal photographing processing is performed, and the visible light image data is stored in the memory 316.

Next, as shown in FIG. 9B, the filter section is switched to the side of the visible light cut filter 324, and the infrared light image data is obtained. Two types of images can be provided synchronously at a time by sending the visible light image from the memory 316 to the living body recognition unit 134 at the same time as photographing of the infrared light image. In this way, two types of images can be obtained by consecutively photographing the visible light image and the infrared light image. The two types of data photographed at a short time interval are used on the assumption that they are images of the same condition (images obtained at a time). The imaging unit 320 time-divisionally generates a visible light image (first image data) and an infrared light image (second image data). Then, the living body recognition unit 134 detects a living body based on the visible light image and the infrared light image obtained at different times. The explanation about the imaging apparatus 300 according to the third embodiment is the same as those about the imaging apparatus according to the first and second embodiments including the two imaging units, except that the images are not obtained at a time.

In the above third embodiment, the visible light image on the memory 316 is configured to be sent to the facial position identification unit 132 from the memory at the same time as photographing of the infrared light image. Alternatively, the data may be sent from the memory and the identification processing of the facial position may start before the infrared light image is photographed, i.e., immediately after the visible light image is obtained. Since it takes some time to perform the identification processing of the facial position, the identification processing may start before the photographing processing of the infrared light image, so that the detection processing of the facial position may be performed during exposure period of the infrared light image and during the imaging processing such as transfer of image. As a result, the total processing time can be shortened. In some cases, the identification processing of the facial position may be finished before the infrared light image is obtained.

In the above third embodiment, the visible light image and the infrared light image are assumed to be imaged at the same field angle and the same resolution, but the imaging mode of the solid-state imaging device 102 (sensor) may be switched to image the visible light image and the infrared light image at different resolutions.

Since the visible light image is assumed to be recorded after having been developed, the visible light image is usually photographed in the maximum resolution mode. In contrast, the infrared light image is used only for determining whether the facial position is a living body or not. Therefore, the infrared light image does not need to have the same resolution as the visible light image. Accordingly, when the infrared light image is obtained, it is possible to shorten a reading time of the infrared light image by photographing upon selecting a sensor imaging mode of the same field angle but of a lower resolution as long as whether the infrared light is present or not within the facial image area can be determined.

FIG. 5A shows the example of the visible light image of 12 M pixels arranged in the matrix of 4000 by 3000. FIG. 5B shows the example of the infrared light image of 3 M pixels arranged in the matrix of 2000 by 1500. The infrared light image has only one quarter as many pixels as the visible light image, and accordingly, reading of the infrared light image takes only one quarter as much time as reading of the visible light image. A shorter reading time of the infrared light image brings about advantageous effects in the speed of continuous shooting and the like. Since the field angle is the same, a coordinate in the facial area of the infrared light image can be easily known by calculating the coordinate based on a coordinate in the facial area of the visible light image although the resolution is different.

In the above third embodiment, the visible light image and the infrared light image are assumed to be imaged at the same field angle. When the facial position is already identified before the infrared light image is photographed, the field angle may not be the same, and an area including a portion of the facial position may be read upon being cropped out of the sensor. As a result, the infrared light image can be read in a shorter time while the same resolution as the visible light image is maintained.

FIG. 5C shows an example of an infrared light image of 3 M pixels arranged in a matrix of 2000 by 1500. The infrared light image corresponds to a portion of the visible light image. The infrared light image has only one quarter as many pixels as the visible light image, and accordingly, reading of the infrared light image takes only one quarter as much time as reading of the visible light image. Since the start position of cropping of the infrared light image is fixed and previously known, a coordinate in the facial area of the infrared light image can be easily known by calculating the coordinate based on a coordinate in the facial area of the visible light image, although the infrared light image and the visible light image are different in the field angle.

Further, both of the above examples may be used together, so that the reading time of the infrared light image can be further shortened by employing not only low resolution but also cropping. Even in such case, a coordinate in the facial area of the infrared light image can be easily known by calculating the coordinate based on a coordinate in the facial area of the visible light image.

Modification of Third Embodiment

Next, a modification of the imaging apparatus 300 according to the third embodiment of the present invention will be described.

Figure 10A:
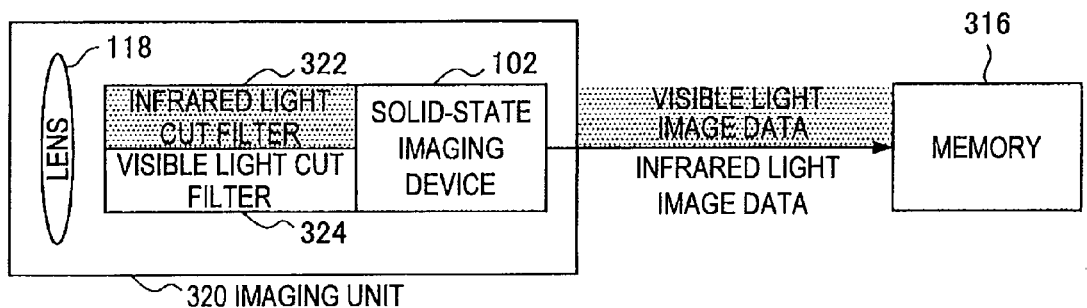
FIG. 10 is a block diagram showing a portion of a configuration of a modification of the imaging apparatus according to the embodiment.
Figure 10B:
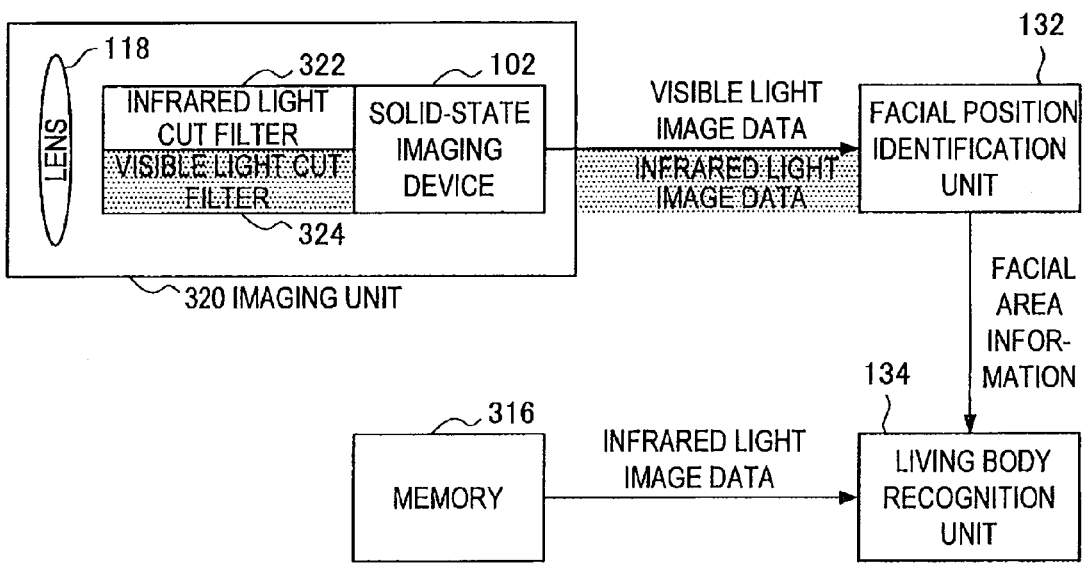

FIG. 10A and FIG. 10B shows exemplary operations where the infrared light image is photographed first in contrast to the cases of FIG. 9A and FIG. 9B. FIG. 10 is a block diagram showing a portion of a configuration of the modification of the imaging apparatus 300 according to the present embodiment. As shown in FIG. 10A, the filter section of the imaging unit 320 is switched to the side of the visible light cut filter 324 at first, and the infrared light image data is stored in the memory 316. Subsequently, as shown in FIG. 10B, the filter section of the imaging unit 320 is switched to the side of the infrared light cut filter 322, and the visible light image data is obtained. Two types of images can be provided synchronously at a time by sending the infrared light image from the memory 316 to the living body recognition unit 134 at the same time as photographing of the visible light image.

The explanation about the modification of the imaging apparatus 300 according to the third embodiment is the same as the explanation about the imaging apparatus 300 according to the third embodiment except for the order of image acquisition. The order of image acquisition does not matter as long as two types of images, i.e., the infrared light image and the visible light image, are obtained.

In the above third embodiment, the infrared light image itself is stored in the memory 316. Alternatively, processed data, such as binary data obtained as a result of determination as to whether infrared light output is present or not, may be stored as a substitute for the infrared light image itself. For example, when the memory 316 stores binary data representing whether infrared light is present or not in each pixel, the amount of data is reduced, and the work memory requires less size. A smaller work memory brings about advantageous effects in the processing steps of the imaging apparatus 300. For example, if the pixel data is assumed to be represented by 8 bits per pixel, the processed data is considered to be represented by 1 bit per pixel. Therefore, the work memory requires one eighth as much size as the original size if the processed data are employed as a substitute for the infrared light image itself.

4. Fourth Embodiment

Next, a digital single-lens reflex camera 400 according to the fourth embodiment of the present invention will be described.

Figure 11:
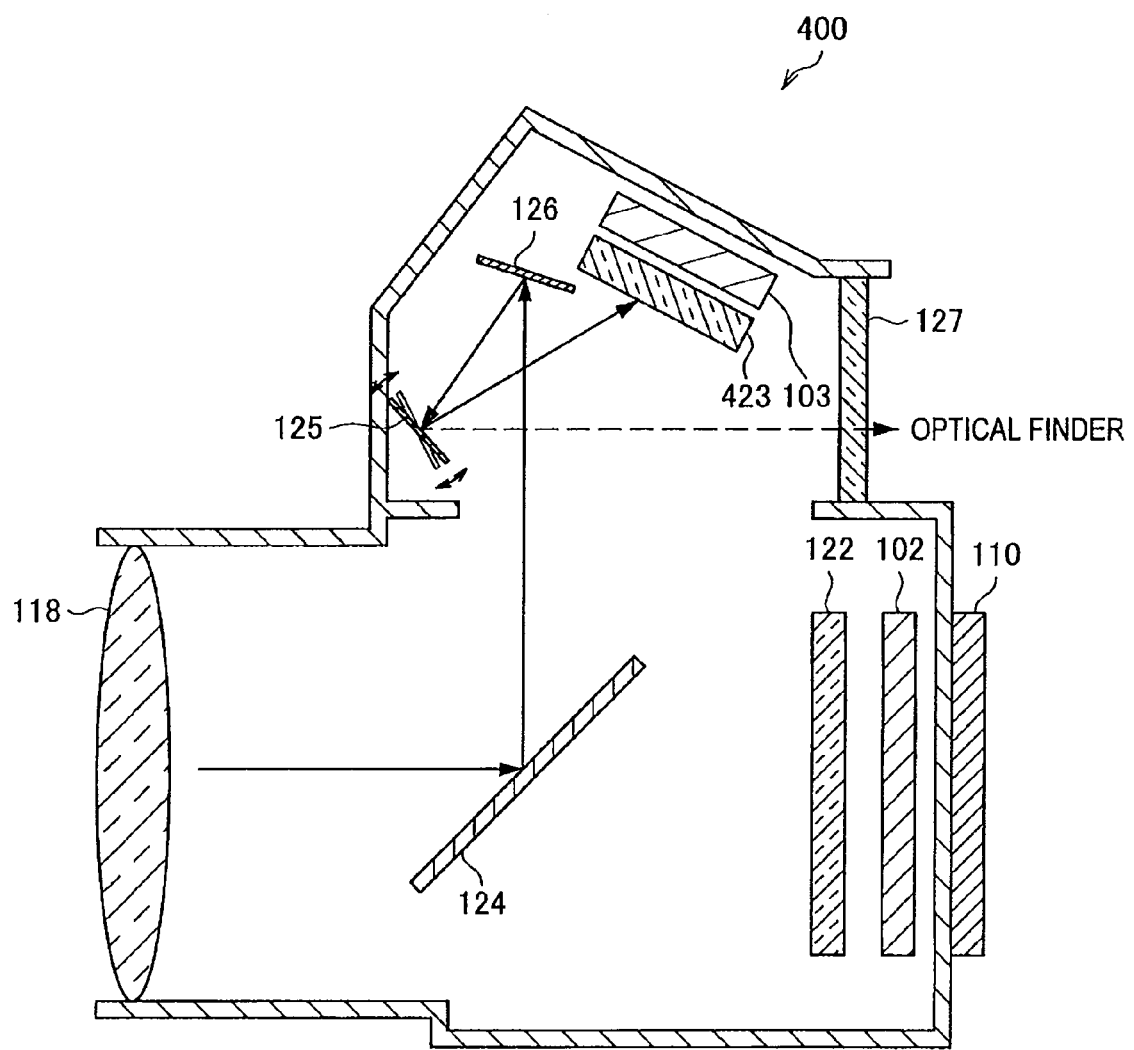
FIG. 11 is a cross sectional diagram showing a digital single-lens reflex camera according to the fourth embodiment of the present invention.

FIG. 11 is a cross sectional diagram showing the digital single-lens reflex camera 400 according to the present embodiment. For the sake of explanation, some component parts such as an iris and a shutter are omitted.

Before the instance of photographing (shutter), an image is displayed on previously-selected one of an optical finder 127 and an electronic viewfinder (for example, a liquid crystal panel 110).

When the optical finder 127 is selected, the image incident through the imaging lens 118 is reflected upward by a reflection mirror 124 arranged in a central portion so as to be movable upward and downward. The reflected light is further reflected several times by a mirror 126 (or a prism (not shown)), a movable mirror 125, and the like in a pentagonal unit, and is transmitted to the optical finder 127.

When the electronic viewfinder is selected, the angle of the movable mirror 125 arranged at the last stage is changed so that the image reaches the solid-state imaging device 103. A filter 423 (infrared cut filter) is arranged before the solid-state imaging device 103. The filter 423 is switchable between an infrared cut filter and a visible light cut filter, and the infrared light image and the visible light image can be obtained with only the solid-state imaging device 103 by time-divisionally switching the filter 423 before the shutter is triggered. As a result, the above-described living body facial recognition function according to the present embodiment can be realized.

The visible light image photoelectrically converted by the solid-state imaging device 103 is subjected to image processings and is displayed on the display panel 110 on the back surface of the digital single-lens reflex camera 400. When the shutter button is pressed, the reflection mirror 124 arranged in the central portion moves upward to retract from a photographing optical path. Then, the image input from the imaging lens 118 directly passes through the filter 122 (infrared cut filter) and reaches the solid-state imaging device 102. The digital single-lens reflex camera 400 as described above is not configured to allow both of the solid-state imaging device 102 and the solid-state imaging device 103 to image an image at a time.

5. Fifth Embodiment

Next, a digital single-lens reflex camera 500 according to the fifth embodiment of the present invention will be described.

Figure 12:
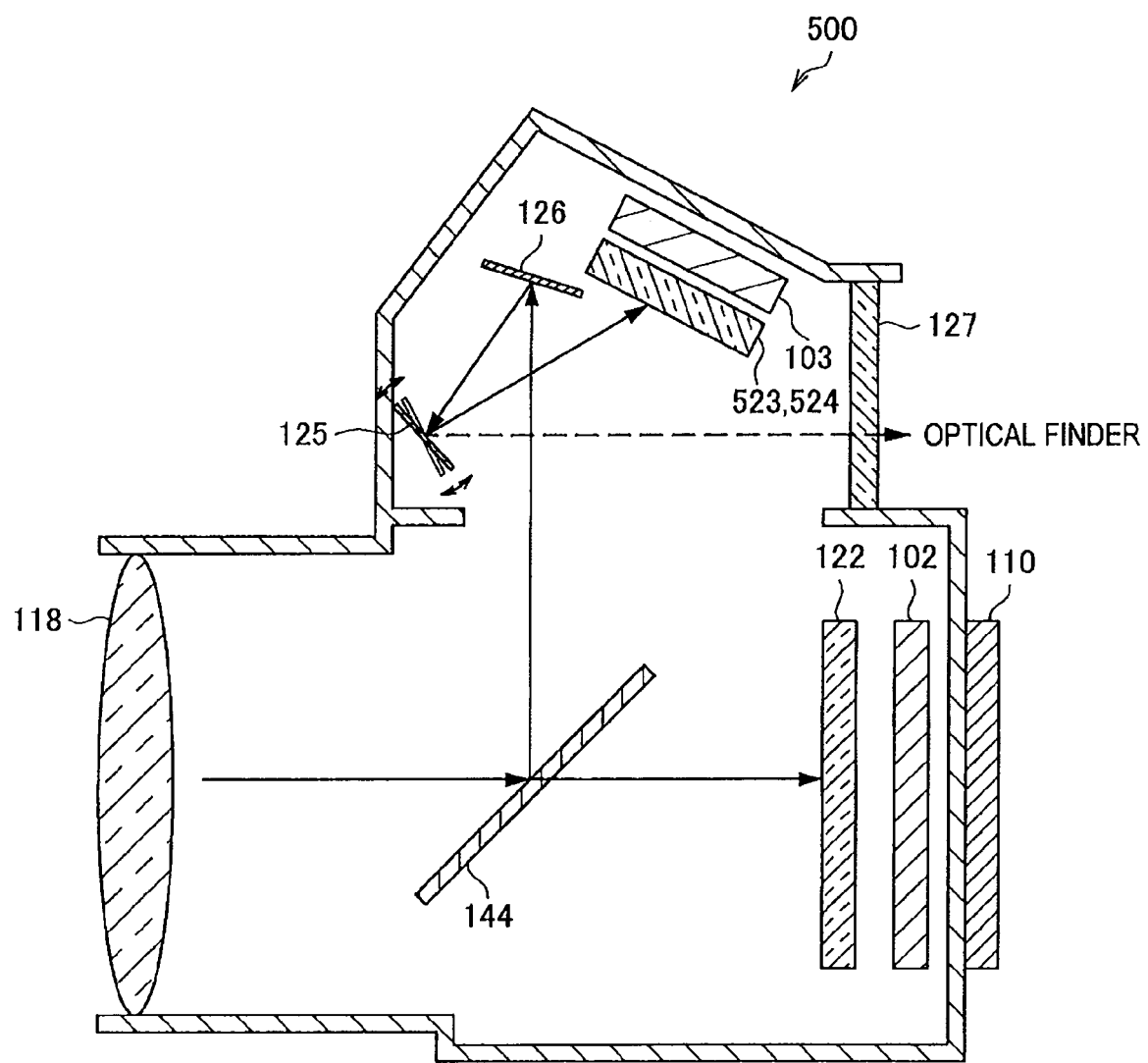
FIG. 12 is a cross sectional diagram showing a digital single-lens reflex camera according to a fifth embodiment of the present invention.

FIG. 12 is a cross sectional diagram showing the digital single-lens reflex camera 500 according to the present embodiment. In the example shown in FIG. 12, the reflection mirror 124 arranged in the central portion of FIG. 11 is replaced with a half mirror 144. In the example shown in FIG. 12, although the amount of light decreases, both of the solid-state imaging device 102 and the solid-state imaging device 103 can reach an image at a time.

Figure 13A:
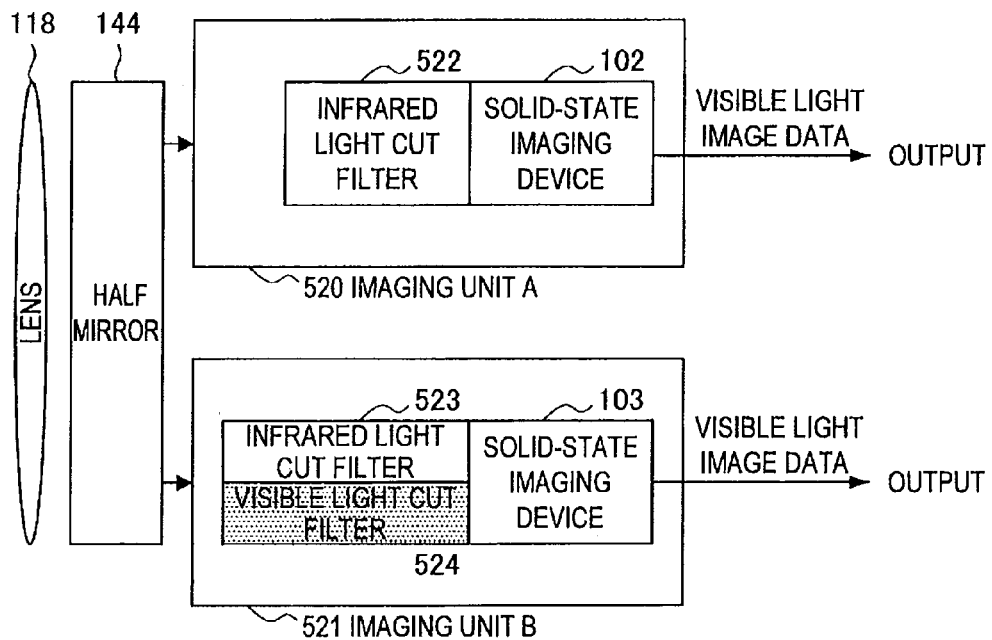
FIG. 13 is a block diagram showing a portion of a digital single-lens reflex camera according to the embodiment.
Figure 13B:
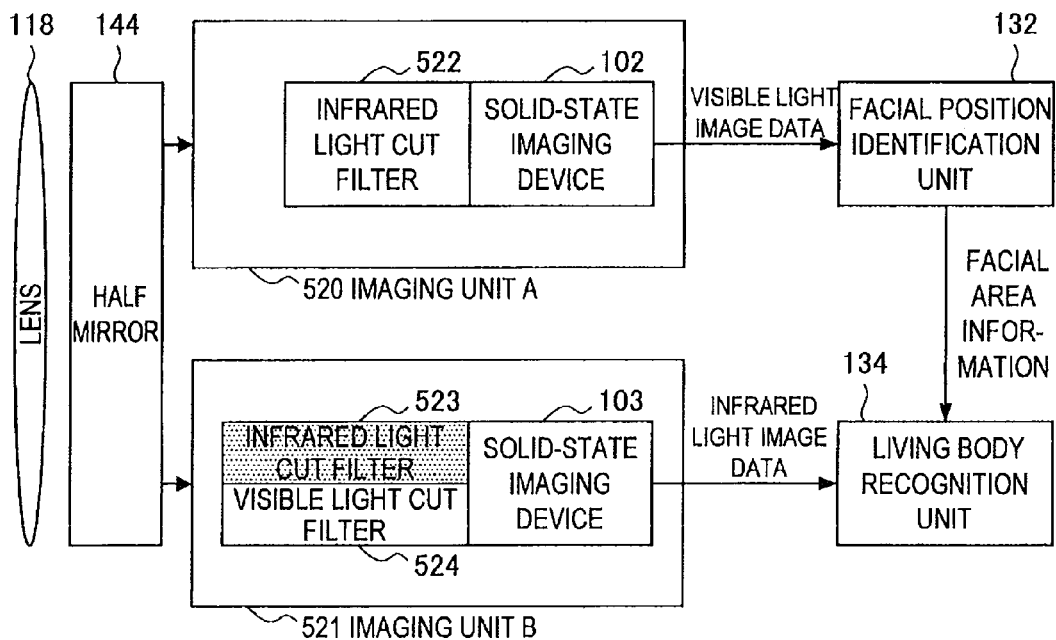

FIG. 13A and FIG. 13B are block diagrams showing a portion of the digital single-lens reflex camera 500 according to the present embodiment. An imaging apparatus 400 includes one imaging lens 118, two imaging units, i.e., an imaging unit A 520 and an imaging unit B 521, and the half mirror 144.

In this embodiment, the filter section arranged before the solid-state imaging device 103 shown in FIG. 12 is configured to be switchable between an infrared light cut filter 523 and a visible light cut filter 524. In this embodiment, there is only one lens, whereas the solid-state imaging devices 102 and 103 and the imaging lenses 118 and 119 respectively make pairs as shown in FIG. 6A and FIG. 6B. Therefore, the present embodiment is different from the embodiment shown in FIG. 6A and FIG. 6B in that the image is separated into two systems by the half mirror 144. The present embodiment is the same as the embodiment shown in FIG. 6A and FIG. 6B in that there are two imaging units, i.e., the imaging unit A 520 and the imaging unit B 521. Further, since specific operations of the present embodiment are the same, the explanation thereabout is omitted.

6. Effects of Each Embodiment

As described above, the imaging apparatuses 100, 200, 300, 400 and 500 capable of performing the living body facial recognition does not need an expensive and bulky spectroscope (such as prism), and does not need a dedicated solid-state imaging device having pixels exclusively for infrared light, which deteriorates the quality of images. Further, the imaging apparatuses 100, 200, 300, 400 and 500 can be made with an inexpensive, small imaging unit used in an ordinary digital camera.

Further, the facial position is first identified with the visible light image, so that a face of a living body and a face of a non-living body can be respectively recognized in a highly reliable manner while reducing the probability of erroneous determination.

The information about the facial area within the image obtained by the facial recognition function is used for various camera controls performed according to the facial area, namely, AF (Auto Focus) and AE (Auto Exposure) which are preparation before photographing, and is also used for white balance correction during developing processing. Further, a face frame can be displayed on the display unit in accordance with the detected facial area, and the face frame can be displayed in such a manner that the face frame moves to follow the movement of the subject.

According to the present embodiment, data about the facial area of a living body is used to optimize AF so that AF is well suited for a primary subject. Further, data about the facial areas of not only living bodies but also a non-living bodies can be used in order to increase parameters of data in white balance, and the facial areas of the living bodies and the facial areas of the non-living bodies can be distinguished, so that appropriate data can be used as necessary by making use of the advantage of distinguishing and the advantage of not distinguishing. As a result, more appropriate various processings can be realized.

In contrast to the technique of JP-A No. H5-297152, the imaging apparatus according to the present embodiment does not require a radiation thermometer and a temperature detection direction control apparatus. Therefore, the imaging apparatus according to the present embodiment can be made smaller and can be manufactured at low cost. In the past, erroneous determination is often made when the facial area is first estimated by using infrared light image data. In the present embodiment, the facial recognition is first performed with a highly accurate visible light image. Further, in the present embodiment, the infrared light image is not used for facial recognition, and therefore, erroneous determination is seldom made.

Since the facial recognition with the visible light image achieves high accuracy, a face printed on a sheet may be erroneously recognized as a face when the facial recognition is based on only the visible light image. The living body detection using the infrared light image can distinguish a face of a living body from a face of a non-living body, thus achieving a highly reliable facial image recognition.

The imaging apparatus according to the present embodiment has at least two or more imaging systems, i.e., a visible light imaging system receiving visible light through the infrared light cut filter and an infrared light imaging system receiving infrared light through the visible light cut filter. Therefore, the quality of image does not deteriorate on the side of the visible light image due to the generated infrared light image.

On the other hand, when light is separated by one spectroscope in a manner similar to the technique of JP-A No. 2005-197914, the apparatus becomes quite large in order to ensure an optical path, and further, a spectroscope that does not deteriorate the quality of image is expensive. In contrast, in the present embodiment, no spectroscope is needed, the quality of image does not deteriorate, and the apparatus is small and can be made at low cost.

The imaging apparatus according to the present embodiment can be realized by changing one infrared cut filter of one of a plurality of visible light imaging systems of an ordinary imaging apparatus to the filter section that is switchable between the visible light cut filter and the infrared light cut filter. Therefore, the imaging apparatus according to the present embodiment can be made easily at low cost without deteriorating the functions of the ordinary imaging apparatus.

Further, the imaging apparatus according to the present embodiment may be made with only one ordinary imaging device by time-divisionally switching a plurality of spectroscope filters. Therefore, the imaging apparatus according to the present embodiment can be made smaller at lower cost.

It should be understood by those skilled in the art that various modifications, combinations, sub-combinations and alterations may occur depending on design requirements and other factors insofar as they are within the scope of the appended claims or the equivalents thereof.

In the above-described embodiment, the facial position identification unit of the imaging apparatus finds a facial image to identify the data area corresponding to the facial image of a person within the screen based on the visible light image data, but the present invention is not limited thereto. For example, a subject image position identification unit may find not only the face of a person but also a portion or the entirety of a person to identify a data area corresponding to the facial image of a person within the screen based on the visible light image data. The processing for detecting a figure of a person includes the steps of cropping a portion of image data and comparing the portion with a reference pattern previously prepared in a database and the like to perform matching, thus detecting whether a pattern of a person is present.

The present application contains subject matter related to that disclosed in Japanese Priority Patent Application JP 2008-311626 filed in the Japan Patent Office on 5 Dec. 2008, the entire content of which is hereby incorporated by reference.

What is claimed is:

1. An imaging apparatus comprising:
an imaging unit including a first photoelectrical conversion device and a second photoelectrical conversion device, wherein the first photoelectrical conversion device generates first image data by photoelectrically converting a visible light component transmitted from a subject, and wherein the second photoelectrical conversion device generates second image data by photoelectrically converting an infrared light component transmitted from the subject;

a filter arranged on an optical axis extending from the subject and arranged on the subject side of the second photoelectrical conversion device, wherein the filter removes the visible light component but allows the infrared light component to pass through;

a subject image position identification unit for identifying, in the first image data, a predetermined subject image and a position of the predetermined subject image within a screen;

an infrared light intensity detection unit for detecting an infrared light intensity transmitted from the subject in the second image data; and a living body detection unit for detecting a living body based on the position of the predetermined subject image within the screen and the infrared light intensity at the position.

2. The imaging apparatus according to claim 1, wherein the living body detection unit specifies a living body detection area in the second image data in accordance with the position of the predetermined subject image within the screen, and detects the living body based on the detected infrared light intensity within the living body detection area.

3. The imaging apparatus according to claim 1, wherein the living body detection unit detects the living body based on the first image data and the second image data, which are obtained at a time.

4. The imaging apparatus according to claim 1, wherein the filter is a movable member that can be arranged on the optical axis extending from the subject and that can be displaced from the optical axis.

5. An imaging apparatus comprising:

an imaging unit including one imaging device, wherein the imaging device generates first image data by photoelectrically converting, in a first mode, a visible light component transmitted from a subject, and generates second image data by photoelectrically converting, in a second mode, an infrared light component transmitted from the subject;

a filter for removing the visible light component but allowing the infrared light component to pass through, wherein the filter is switched by moving so that in the first mode, the filter is displaced from the optical axis extending from the subject to the imaging device and that in the second mode, the filter is arranged on the optical axis and arranged on the subject side of the imaging device;

a subject image position identification unit for identifying, in the first image data, a predetermined subject image and a position of the predetermined subject image within a screen;

an infrared light intensity detection unit for detecting an infrared light intensity transmitted from the subject in the second image data; and a living body detection unit for detecting a living body based on the position of the predetermined subject image within the screen and the infrared light intensity at the position.

6. The imaging apparatus according to claim 5, wherein the imaging unit time-divisionally generates the first image data and the second image data, and the living body detection unit detects the living body based on the first image data and the second image data, which are obtained at different times.

7. The imaging apparatus according to claim 1, wherein the predetermined subject image is a face of a person or a portion or an entirety of a person.

8. An imaging apparatus comprising:

an imaging unit for generating first image data by photoelectrically converting a visible light component transmitted from a subject and generating second image data by photoelectrically converting an infrared light component transmitted from the subject;

a subject image position identification unit for identifying, in the first image data, a predetermined subject image and a position of the predetermined subject image within a screen;

an infrared light intensity detection unit for detecting an infrared light intensity transmitted from the subject in the second image data; and a living body detection unit for detecting a living body based on the position of the predetermined subject image within the screen and the infrared light intensity at the position.

9. An imaging method comprising the steps of:

generating first image data by causing a first photoelectrical conversion device to photoelectrically convert a visible light component transmitted from a subject;

causing a filter to remove the visible light component and allowing an infrared light component to pass through;

generating second image data by causing a second photoelectrical conversion device to photoelectrically convert an infrared light component transmitted from the subject;

identifying, in the first image data, a predetermined subject image and a position of the predetermined subject image within a screen;

detecting an infrared light intensity transmitted from the subject in the second image data; and detecting a living body from the position of the predetermined subject image within the screen and the infrared light intensity at the position, based on the first image data and the second image data, which are obtained at a time.

10. An imaging method comprising the steps of:

generating first image data by causing one photoelectrical conversion device to photoelectrically convert a visible light component transmitted from a subject;

arranging a filter on an optical axis extending from the subject to the one photoelectrical conversion device and arranged on the subject side of the one photoelectrical conversion device so that the filter removes the visible light component but allows an infrared light component to pass through;

generating second image data by causing the one photoelectrical conversion device to photoelectrically convert the infrared light component transmitted from the subject;

identifying a predetermined subject image in the first image data and a position of the predetermined subject image within a screen;

detecting an infrared light intensity transmitted from the subject in the second image data; and detecting a living body from the position of the predetermined subject image within the screen and the infrared light intensity at the position, based on the first image data and the second image data, which are obtained at different times.

* * * * *